(12) United States Patent
Naik et al.

(10) Patent No.: US 10,261,515 B2
(45) Date of Patent: Apr. 16, 2019

(54) SYSTEM AND METHOD FOR CONTROLLING NAVIGATION OF A VEHICLE

(71) Applicant: Wipro Limited, Bangalore (IN)

(72) Inventors: Shrinath Naik, Bangalore (IN); Basavaraj Shivappa Betageri, Bangalore (IN)

(73) Assignee: Wipro Limited, Bangalore (IN)

( * ) Notice: Subject to any disclaimer, the term of this patent is extended or adjusted under 35 U.S.C. 154(b) by 123 days.

(21) Appl. No.: 15/461,662

(22) Filed: Mar. 17, 2017

(65) Prior Publication Data

US 2018/0210451 A1    Jul. 26, 2018

(30) Foreign Application Priority Data

Jan. 24, 2017    (IN) .............................. 201741002743

(51) Int. Cl.
*G05D 1/02* (2006.01)
*B60W 30/09* (2012.01)
(Continued)

(52) U.S. Cl.
CPC ........... *G05D 1/0246* (2013.01); *B60W 30/09* (2013.01); *G06K 9/00805* (2013.01);
(Continued)

(58) Field of Classification Search
CPC ............. G05D 1/0246; G06K 9/00805; G06K 9/4606; B60W 2550/10; B60W 2420/42; B60W 2720/10; B60W 2720/14
See application file for complete search history.

(56) References Cited

U.S. PATENT DOCUMENTS 6,727,807 B2    4/2004    Trajkovic et al.
7,072,764 B2    7/2006    Donath et al.
(Continued)

FOREIGN PATENT DOCUMENTS

KR    1020110032065    3/2011

OTHER PUBLICATIONS

S. Nienaber, et al., "Detecting potholes using simple image processing techniques and real-world footage", 10 pages.
(Continued)

*Primary Examiner* — Peter D Nolan
(74) *Attorney, Agent, or Firm* — Finnegan, Henderson, Farabow, Garrett & Dunner LLP (57) ABSTRACT

This disclosure relates generally to controlling navigation of a vehicle and more particularly to a system and method for controlling the navigation of the vehicle based on a distance between the vehicle and an obstruction.
A system for controlling navigation of a vehicle is disclosed. The system comprises a processor and a memory communicatively coupled to the processor. The memory stores processor instructions, which, on execution, causes the processor to generate an embedded image comprising a pre-generated reference object image and an obstruction image. The processor further determines a reference-obstruction distance based on the embedded image, wherein the reference-obstruction distance is a distance between a reference object and an obstruction. The processor further determines a distance between the vehicle and the obstruction based on the reference-obstruction distance. The processor further controls navigation of the vehicle based on the distance between the vehicle and the obstruction.

12 Claims, 3 Drawing Sheets

(51) Int. Cl.
*G06K 9/00* (2006.01)
*G06K 9/46* (2006.01)
*G08G 1/16* (2006.01)

(52) U.S. Cl.
CPC ....... *G06K 9/4604* (2013.01); *B60W 2420/42* (2013.01); *B60W 2550/10* (2013.01); *B60W 2720/10* (2013.01); *B60W 2720/14* (2013.01); *G05D 2201/0213* (2013.01); *G08G 1/165* (2013.01)

(56) References Cited

U.S. PATENT DOCUMENTS

| | | | | |
|---|---|---|---|---|
| 9,535,423 | B1* | 1/2017 | Debreczeni | G05D 1/0246 |
| 9,710,899 | B2* | 7/2017 | Seki | G06T 3/0018 |
| 9,802,539 | B2* | 10/2017 | Gehrke | G06T 7/73 |
| 9,815,475 | B2* | 11/2017 | Spata | E01C 23/01 |
| 9,944,317 | B2* | 4/2018 | Lee | B62D 15/0265 |
| 9,965,699 | B2* | 5/2018 | Sorstedt | B60R 1/00 |
| 2008/0008355 | A1* | 1/2008 | Okamoto | G06K 9/00369 |
| | | | | 382/104 |
| 2009/0060273 | A1* | 3/2009 | Stephan | G06K 9/42 |
| | | | | 382/103 |
| 2009/0097038 | A1* | 4/2009 | Higgins-Luthman | |
| | | | | B60G 17/019 |
| | | | | 356/602 |
| 2011/0018973 | A1* | 1/2011 | Takayama | G01C 3/06 |
| | | | | 348/47 |
| 2012/0213412 | A1* | 8/2012 | Murashita | G06T 7/0042 |
| | | | | 382/104 |
| 2013/0223689 | A1* | 8/2013 | Saito | G06K 9/00791 |
| | | | | 382/104 |
| 2013/0314503 | A1* | 11/2013 | Nix | G06K 9/00805 |
| | | | | 348/46 |
| 2014/0184814 | A1* | 7/2014 | Lin | H04N 17/002 |
| | | | | 348/187 |
| 2014/0334689 | A1* | 11/2014 | Butler | G06T 7/001 |
| | | | | 382/108 |
| 2015/0117715 | A1* | 4/2015 | Murao | G06K 9/00825 |
| | | | | 382/104 |
| 2015/0224925 | A1* | 8/2015 | Hartmann | B60R 1/00 |
| | | | | 348/148 |
| 2015/0294161 | A1* | 10/2015 | Schamp | B60K 31/00 |
| | | | | 701/37 |
| 2016/0034771 | A1* | 2/2016 | Schamp | G01B 11/2545 |
| | | | | 348/148 |
| 2016/0125608 | A1* | 5/2016 | Sorstedt | B60R 1/00 |
| | | | | 348/148 |
| 2016/0125612 | A1* | 5/2016 | Seki | G06T 3/0018 |
| | | | | 382/106 |
| 2016/0292518 | A1* | 10/2016 | Banitt | G06K 9/00805 |
| 2016/0339959 | A1* | 11/2016 | Lee | B62D 15/0265 |
| 2017/0076163 | A1* | 3/2017 | Lin | G06T 7/74 |
| 2017/0144669 | A1* | 5/2017 | Spata | E01C 23/01 |
| 2017/0285646 | A1* | 10/2017 | Connor | B60W 50/14 |
| 2017/0285649 | A1* | 10/2017 | Debreczeni | G05D 1/0246 |
| 2018/0068495 | A1* | 3/2018 | Chainer | G07C 5/008 |
| 2018/0086262 | A1* | 3/2018 | Morel | G08G 1/162 |
| 2018/0144199 | A1* | 5/2018 | Perez Barrera | G06K 9/4652 |

OTHER PUBLICATIONS

Nilam Kumbhar, et al., "Intelligent pothole detection and notification system", *International Journal of Engineering Science and Computing*, vol. 6, No. 4, Apr. 2016, pp. 3451-3453.

* cited by examiner

SYSTEM AND METHOD FOR CONTROLLING NAVIGATION OF A VEHICLE

PRIORITY CLAIM

This U.S. patent application claims priority under 35 U.S.C. § 119 to: Indian Application No, 201741002743, filed Jan. 24, 2017. The aforementioned applications are incorporated herein by reference in their entirety.

TECHNICAL FIELD

This disclosure relates generally to controlling navigation of a vehicle and more particularly to a system and method for controlling the navigation of the vehicle based on a distance between the vehicle and an obstruction using image processing.

BACKGROUND

Concept of autonomous vehicles used to be a subject of science fiction, but now it has become a reality. The supporters of the autonomous vehicles insist that reduction in accidents, improved emission compliance and reduction in traffic may be expected once the autonomous vehicles becomes a common sight. However, dynamic nature of road conditions may create difficulties in smooth running of the autonomous vehicles. The road conditions may be influenced by accidents, humps, speed bumps and potholes. In rural areas, especially, the road conditions are deplorable. Hence, there arises a need to accurately determine information regarding the road conditions in a timely manner.

For the autonomous vehicles, simply receiving correct information regarding the road conditions is not enough. Navigation of the autonomous vehicle needs to be controlled depending on a determined distance of the autonomous vehicle from an obstruction on a road. If instead, the autonomous vehicles move with a constant speed without taking into account the road conditions, then, road accidents, user discomfort and reduction of vehicle life may ensue.

Present technology for determining the distance of the autonomous vehicle from the obstruction is through LIDAR (Light Detection and Ranging). LIDAR technology can determine the distance by identifying a time taken by a laser beam to collide with the obstruction and rebound back to the LIDAR. However, the LIDAR technology is very expensive.

SUMMARY

In an embodiment, the present disclosure illustrates a method of controlling navigation of a vehicle. The method comprising generating an embedded image comprising a pre-generated reference object image and an obstruction image, wherein the obstruction image is captured by an image capturing device associated with the vehicle. The method further comprising determining a reference-obstruction distance based on the embedded image, wherein the reference-obstruction distance is a distance between a reference object and an obstruction. The method further comprising determining a distance between the vehicle and the obstruction based on the reference-obstruction distance. The method further comprising controlling navigation of the vehicle based on the distance between the vehicle and the obstruction.

In another embodiment, a system for controlling navigation of a vehicle is disclosed. The system comprises a processor and a memory communicatively coupled to the processor. The memory stores processor instructions, which, on execution, causes the processor to generate an embedded image comprising a pre-generated reference object image and an obstruction image, wherein the obstruction image is captured by an image capturing device associated with the vehicle. The processor further determines a reference-obstruction distance based on the embedded image, wherein the reference-obstruction distance is a distance between a reference object and an obstruction. The processor further determines a distance between the vehicle and the obstruction based on the reference-obstruction distance. The processor further controls navigation of the vehicle based on the distance between the vehicle and the obstruction.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an" and "the" include plural references unless the context clearly dictates otherwise.

Figure 1:
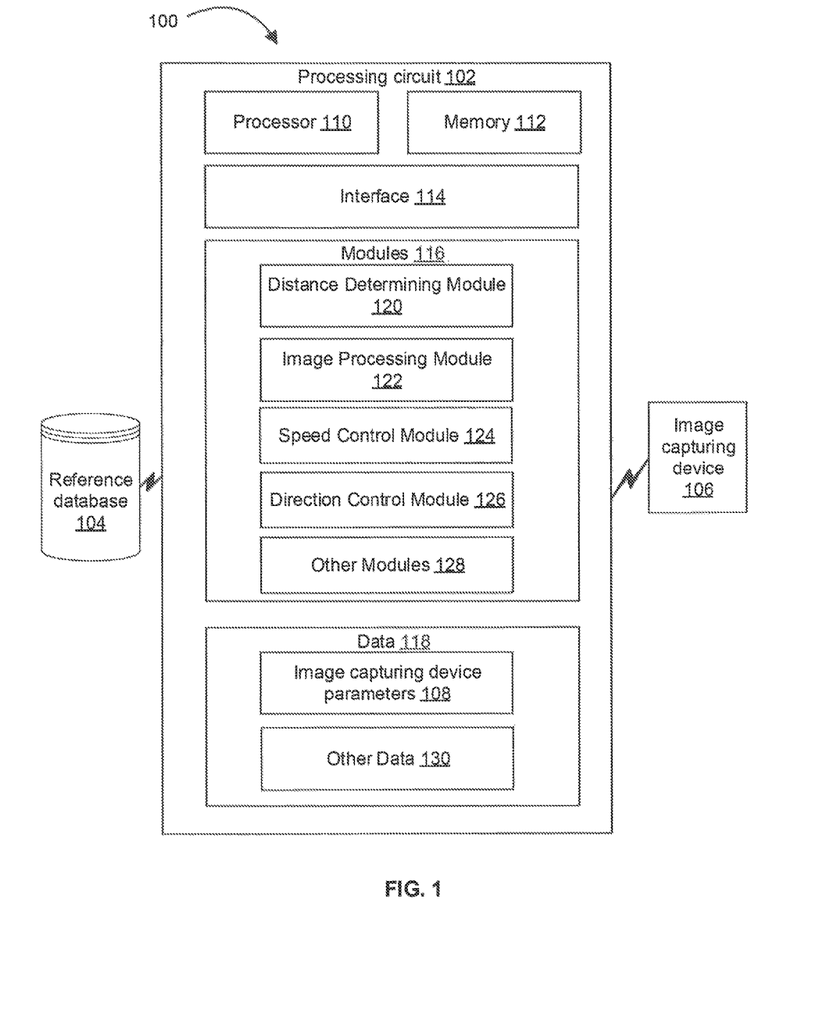
FIG. 1 illustrates an exemplary network implementation comprising a processing circuit for controlling navigation of a vehicle, according to some embodiments of the present disclosure.
Figure 2:
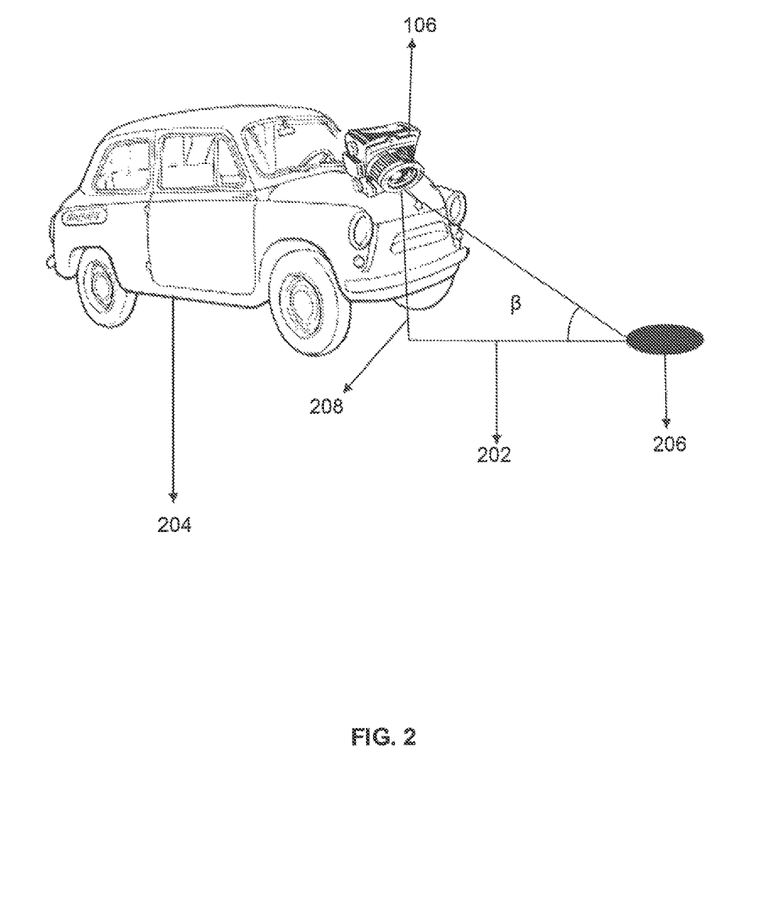
FIG. 2 is a schematic diagram, illustrating a methodology for determining a distance of a vehicle from a reference object, in accordance with some embodiments of the present disclosure.
Figure 3:
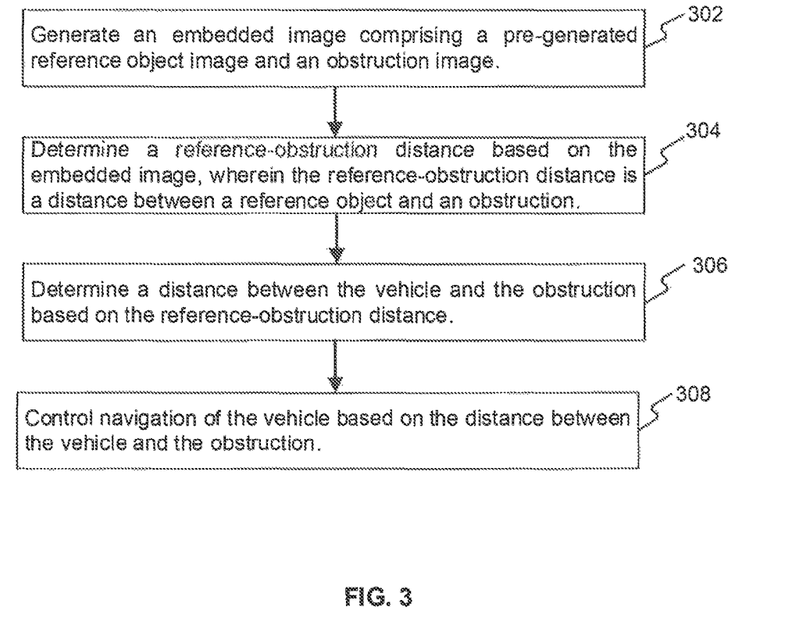
FIG. 3 illustrates a flowchart of a method of controlling navigation of a vehicle, in accordance with some embodiments of the present disclosure.

Working of the systems and methods for controlling navigation of a vehicle is described in conjunction with FIG. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network implementation 100 comprising a processing circuit 102, in accordance with some embodiments of the present disclosure. As shown in FIG. 1, the processing circuit 102 may be communicatively coupled to a reference database 104 and may further be communicatively coupled to an image capturing device 106. In one illustration, the focal length of the image capturing device 106 may be in range of 20 millimeter to 70 millimeter. The reference database 104 may include Image capturing device parameters 108, pre-generated reference object images corresponding to the image capturing device parameters and distance between a vehicle and a reference object corresponding to the image capturing device parameters. The Image capturing device parameters 108 may include orientation of the image capturing device 106, height from ground level to position of image capturing device 106 and vertical viewing angle of the image capturing device 106. Although, the reference database 104 and the image capturing device 106 is shown external to the processing circuit 102 in FIG. 1, it may be noted that in one implementation, the reference database 104 and the image capturing device 106 may be present within the processing circuit 102.

As shown in FIG. 1, the processing circuit 102 comprises a processor 110, a memory 112 coupled to the processor 110, and interface(s) 114. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions stored in the memory 112. The memory 112 can include any non-transitory computer-readable medium known in the art including, for example, volatile memory (e.g., RAM), and/or non-volatile memory (e.g., EPROM, flash memory, etc.).

The interface(s) 114 may include a variety of software and hardware interfaces, allowing the processing circuit 102 to interact with the image capturing device 106. Further, the interface(s) 114 may enable the processing circuit 102 to communicate with other computing devices.

In one example, the processing circuit 102 includes modules 116 and data 118. In one embodiment, the modules 116 and the data 118 may be stored within the memory 112. In one example, the modules 116, amongst other things, include routines, programs, objects, components, and data structures, which perform particular tasks or implement particular abstract datatypes.

In one implementation, the modules 116 include a Distance Determining Module 120, an Image Processing Module 122, a Speed Control Module 124, and a Direction Control Module 126. In an example, the modules 116 may also comprise other modules 128. The other modules 128 may perform various miscellaneous functionalities of the processing circuit 102. It will be appreciated that such aforementioned modules may be represented as a single module or a combination of different modules.

In one example, the data 118 serves, among other things, as a repository for storing data fetched, processed, received and generated by one or more of the modules 116. In one implementation, the data 118 may include Image capturing device parameters 108. The Image capturing device parameters 108 may include the orientation of the image capturing device 106, the height from the ground level to the position of the image capturing device 106, or the vertical viewing angle of the image capturing device 106. In one embodiment, the data 118 may be stored in the memory 112 in the form of various data structures. In an example, the data 118 may also comprise other data 130 including temporary data and temporary files, generated by the modules 116 for performing the various functions of the processing circuit 102.

In order to control navigation of a vehicle, an embedded image may be generated by the Image Processing Module 122. The embedded image may include a pre-generated reference object image and an obstruction image. The pre-generated reference object image may be extracted from the reference database 104. However, the obstruction image may be captured in real time by the image capturing device 106, when the vehicle encounters an obstruction. The processing circuit 102 identifies when the vehicle encounters the obstruction by capturing several images and analyzing them for presence of the obstruction using image processing techniques. In one embodiment, the image capturing device 106 may be placed at midway between two headlights of the vehicle. In one embodiment, the height from the ground level to the position of the image capturing device 106 may be more than height of the headlights from the ground level. Image processing techniques may be used to combine the pre-generated reference object image with the obstruction image, in order to generate the embedded image.

The pre-generated reference object image may be extracted from the reference database 104 by looking up the reference database 104 with the Image capturing device parameters 108 that may be associated with the image capturing device 106 when the vehicle is in motion and captures the obstruction image. The reference database 104 may include the Image capturing device parameters 108, the pre-generated reference object images corresponding to the Image capturing device parameters 108 and the distance between the vehicle and the reference object corresponding to the Image capturing device parameters 108. The Image capturing device parameters 108 may include the orientation of the image capturing device 106, the height from the ground level to the position of the image capturing device 106 and the vertical viewing angle of the image capturing device 106, wherein the image capturing device 106 may be associated with the vehicle when the vehicle is stationary and the image capturing device 106 is captures the images of the reference object. In order to populate the reference database 104 with a reference object image, an image of the reference object may be captured by the image capturing device 106, when the vehicle is in parked state. This may be considered as a first step of calibration, where images of the reference object may be captured at different values of image capturing device parameters 108. The pre-generated reference object images and the corresponding image capturing device parameters 108 may be used to populate the reference database 104. In one embodiment, the reference object may be placed along a line that is midway between the headlights of the vehicle and placed on the ground level. Positioning of the reference object may also be such that the reference object may be first object appearing from top, bottom, left or right in field of view of the image capturing device 106. In one illustration, the reference object may be circular and radius of the reference object may be 25 centimeters.

After generating the embedded image, a reference-obstruction distance may be determined by the Distance Determining Module 120. The reference-obstruction distance is a distance between the reference object and the obstruction. In order to determine the reference-obstruction distance, initially, the embedded image may be converted to a grey scale image. After conversion to the grey scale image, edges of the obstruction and the reference object may be detected. In one illustration, the edges may be detected using canny edge detection. An edge map may be sketched based on the determined edges. After determining the edges, the gaps in the edge map may be closed, using morphological dilation and erosion. Then, contours in the edge map may be detected from left to right and listed accordingly. In one illustration, the reference object may be the top-most object in the embedded image. Size of the contours are compared with a predefined size. If the size of the contour is less than the predefined size, then the contours are ignored. However, if the size of the contours is greater than the predefined size, rotated bounding box of the grey scale image may be determined.

Coordinates of the rotated bounding box may be arranged in the top-left, the top-right, the bottom-right and the bottom-left corner of the grey scale image. The width of the obstruction may be determined in pixels by determining the Euclidean distance between midpoint of the top-left and the bottom-left coordinates and midpoint of the top-right and the bottom-right coordinates. Pixels-per-metric value may be determined by dividing the determined Euclidean distance between the midpoint of the top-left and the bottom-left coordinates and the midpoint of the top-right and the bottom-right coordinates with the width of the reference object. The pixels-per-metric value may be defined as number of pixels that may be accommodated in a given unit of measurement, for instance, millimeter, meters, inches, centimeter and so on. After determining the pixels-per-metric value the Euclidean distance between actual coordinates of at least one of corners and centroid of the obstruction and the coordinates of at least one of corners and centroid of the reference object may be determined. The Euclidean distance between actual coordinates of the obstruction and coordinates of the reference object may be divided by the pixels-per-metric value to determine the actual distance between the obstruction and the reference object in inches.

In addition to determining the reference-obstruction distance, at least one of depth, width or height of the obstruction may be determined from the embedded image. In order to determine at least one of the depth, the width or the height of the obstruction, the rotated bounding box coordinates may be arranged in the top-left, the top-right, the bottom-right and the bottom-left corner of the grey scale image. At least one of the height and the depth of the obstruction may be determined in pixels by determining Euclidean distance between midpoint of the top-left and the top-right coordinates and midpoint of the bottom-left and the bottom-right coordinates. Then, the pixels-per-metric value may be determined by dividing the determined Euclidean distance between the midpoint of the top-left and the top-right coordinates and the midpoint of the bottom-left and the bottom-right coordinates with the width of the reference object. At least one of the height and the depth of the obstruction may be determined in inches by dividing the determined Euclidean distance between the midpoint of top-left and top-right coordinates and the midpoint of bottom-left and bottom-right coordinates with the pixels-per-metric value. The width of the obstruction may be determined in pixels by determining Euclidean distance between midpoint of the top-left and the bottom-left coordinates and midpoint of the top-right and the bottom-right coordinates. The width of the obstruction may be determined in inches by dividing the determined Euclidean distance between the midpoint of the top-left and the bottom-left coordinates and the midpoint of the top-right and the bottom-right coordinates with the pixels-per-metric value.

After determining the reference-obstruction distance and at least one of the depth, the width and the height of the obstruction, a distance between the vehicle and the obstruction may be determined, again, by the Distance Determining Module 120. Determining the distance between the vehicle and the obstruction is a two-step process. Initially, a distance between the vehicle and the reference object may be extracted from the reference database 104 using the height from the ground level to the position of the image capturing device 106 and the vertical viewing angle of the image capturing device 106. The vertical viewing angle used to extract the distance between the vehicle and the reference object may be the vertical viewing angle of the image capturing device 106 when the image capturing device 106 captures an image of the obstruction. In one embodiment, the vertical viewing angle may be determined from camera specifications. For instance, $\alpha = 2 \arctan d/2f$ equation may be used, wherein $\alpha$ may represent the vertical viewing angle, d may represent size of a film in vertical direction and f may represent the focal length of the image capturing device 106.

The first step of calibration may be to capture images of the reference object. The second step of calibration may be to determine the distance between the vehicle and the reference object. In order to execute the second step of calibration, the distance between the vehicle and the reference object may be determined at exact point of time when an image of the reference object 206 is captured. Populating the reference database 104 may be done previously, so that during run time the pre-generated reference object image and the distance between the vehicle and the reference object may be available to the processing circuit 102. In one illustration, the distance between the vehicle and the reference object may be determined using the formula (h/tan $\beta$), where h may represent the height from the ground level to the position of the image capturing device 106, $\beta$ may represent the angle between the ground level and the image capturing device 106. $\beta$ may be determined using the equation $\beta = 90 - \alpha$.

After determining the distance between the vehicle and the reference object, the distance between the vehicle and the obstruction may be determined. In one illustration, (the distance between the vehicle and the obstruction)=(the reference-obstruction distance)+(the distance between the vehicle and the reference object). In one embodiment, a distance travelled by the vehicle during computation of the reference-obstruction distance may also be taken into account. For instance, (the distance between vehicle and the obstruction)=(the reference-obstruction distance)+(the distance between the vehicle and the reference object)−(the distance travelled by the vehicle during computation).

After determining the distance between the vehicle and the obstruction, navigation of the vehicle may be controlled based on the determined distance between the vehicle and the obstruction and at least one of the depth, the width or the height of the obstruction. Controlling navigation of the vehicle may include controlling speed of the vehicle and controlling direction of the vehicle. The Speed Control Module 124 may be employed to control the speed of the vehicle. The vehicle may be able to negotiate the obstruction at a particular speed. The particular speed may be determined from at least one of the width, the depth or the height of the obstruction. Also, the determined distance between the vehicle and the obstruction may assist in determining a time at which the vehicle needs to decelerate, in order to avoid an accident. In one embodiment, a command control may be sent to one or more actuators in order to control throttle of the vehicle. In one illustration, a rule may be made according to which the vehicle needs to decelerate when the distance between the vehicle and the obstruction is two times the length of the vehicle and vehicle speed is above a particular threshold. In one embodiment, the time at which the vehicle needs to decelerate may also depend on a braking distance of the vehicle. The braking distance may change depending on the weather condition, time of day, composition and condition of tires, quality of suspension, quality of braking system, road conditions, driver's experience and anti-lock braking system etc.

The Direction Control Module 126 may be employed to control the direction of the vehicle. The determined distance between the vehicle and the obstruction may be used to determine a time at which the direction of the vehicle needs to be modified. In one illustration, an alternative path may be made available to the vehicle via Global Positioning System (GPS) technology. In one embodiment, the control command may be sent to the one or more actuators of the vehicle, notifying a command to change the direction of the vehicle. The actuators may control steering, braking and the throttle of the vehicle. In one embodiment, controlling the direction of the vehicle may also include controlling the steering of the vehicle when the vehicle attempts to negotiate the obstruction. The steering of the vehicle may be controlled based on at least one of the depth, the width or the height of the obstruction. Also, the determined distance between the vehicle and the obstruction may be used to determine a time at which the steering of the vehicle needs to be controlled.

In one illustration, the two steps of the calibration may be done when the vehicle is stationary. A reference object may be placed, on a road, in front of the vehicle. The image capturing device 106 may capture images of the reference object at a particular orientation and a particular vertical viewing angle. The distance of the reference object from the stationary vehicle may be determined using the formula (h/tan β). The two steps of the calibration may be completed after determining the reference object images and the distance between the vehicle and the reference object. The reference database 104 may be populated with the height of the placement of the image capturing device 106, the particular orientation, the particular vertical viewing angle, images of the reference object and the distance of the vehicle from the reference object.

After the calibration, the vehicle may be in motion. Images of the road may be continuously taken and analyzed to detect presence of the obstruction. Once the obstruction is detected, the obstruction image may be embedded with an image of the reference object. Distance between the obstruction and the reference object may be determined from the embedded image. The distance between the reference object and the vehicle may be added to the reference-obstruction distance to determine the distance between the vehicle and the obstruction. Speed and direction of the vehicle may be controlled based on the determined distance between the vehicle and the obstruction. In one embodiment, the time at which the vehicle needs to decelerate may depend on a braking distance of the vehicle. In one illustration, a rule may be made according to which the vehicle needs to decelerate when the distance between the vehicle and the obstruction is two times the length of the vehicle and the vehicle speed is above a particular threshold.

FIG. 2 is a schematic diagram, illustrating a methodology for determining a distance 202 of a vehicle 204 from a reference object 206 that is placed in the beginning of top, bottom, left or right of the field of view of an image capturing device 106. In order to populate the reference database 104, the pre-generated reference object images and the distance 202 between the vehicle 204 and the reference object 206 may be determined when the vehicle 204 is in parked state. In one embodiment, the reference object 206 may be placed along a line that is midway between the headlights of the vehicle 204 and placed on ground level. In one illustration, the reference object 206 may be circular and radius of the reference object 206 may be 25 centimeters. In one illustration, the distance 202 between the vehicle 204 and the reference object 206 may be determined using the formula (h/tan β), where h may represent the height 208 from the ground level to the position of the image capturing device 106 and β may represent an angle between ground level and the image capturing device 106. β may also be determined using the equation β=90−α.

FIG. 3 illustrates a flowchart of a method of controlling navigation of a vehicle 204. An embedded image may be generated at step 302. The embedded image may include a pre-generated reference object image and an obstruction image. The pre-generated reference object image may be extracted from a reference database 104 by looking up the reference database 104 with the image capturing device parameters 108 that may be associated with the image capturing device 106 when the vehicle 204 is in motion and captures the obstruction image. The reference database 104 may include image capturing device parameters 108, pre-generated reference object images corresponding to image capturing device parameters 108 and a distance 202 between the vehicle 204 and a reference object 206 corresponding to image capturing device parameters 108. The image capturing device parameters 108 may include orientation of the image capturing device 106, height 208 from ground level to position of the image capturing device 106 and vertical viewing angle of the image capturing device 106, wherein the image capturing device 106 may be associated with the vehicle 204 when the vehicle 204 is stationary and the image capturing device 106 captures images of the reference object 206. In order to populate the reference database 104 with a reference object image, an image of the reference object 206 may be captured when the vehicle 204 is in parked state. This may be considered as a first step of calibration, where images of the reference object 206 may be captured at different values of image capturing device parameters 108. The pre-generated reference object images and the corresponding image capturing device parameters 108 may be used to populate the reference database 104.

While the pre-generated reference object image may be extracted from the reference database 104, the obstruction image may be captured in real time by the image capturing device 106, when the vehicle 204 encounters an obstruction. The processing circuit 102 identifies when the vehicle 204 encounters the obstruction by capturing several images and analyzing them for the presence of the obstruction using image processing techniques. The embedded image may be generated by combining the pre-generated reference object image and the obstruction image by using image processing techniques.

After generating the embedded image, a reference-obstruction distance may be determined, at step 304. The reference-obstruction distance is a distance between the reference object 206 and an obstruction. In order to determine the reference-obstruction distance, initially, the embedded image may be converted to a grey scale image. After conversion to the grey scale image, edges of the obstruction and the reference object 206 may be detected. In one illustration, the edges may be detected using canny edge detection. An edge map may be sketched based on the determined edges. After determining the edges, the gaps in the edge map may be closed, using morphological dilation and erosion. Then, contours in the edge map may be detected from left to right and listed accordingly. In one illustration, the reference object 206 may be top-most object in the embedded image. Size of the contours are compared with a predefined size. If the size of the contour is less than the predefined size, then the contours are ignored. However, if the size of the contours is greater than the predefined size, rotated bounding box of the grey scale image may be determined.

Coordinates of the rotated bounding box may be arranged in top-left, top-right, bottom-right and bottom-left corner of the grey scale image. The width of the obstruction may be determined in pixels by determining the Euclidean distance between midpoint of the top-left and the bottom-left coordinates and midpoint of the top-right and the bottom-right coordinates. Pixels-per-metric value may be determined by dividing the determined Euclidean distance between the midpoint of the top-left and the bottom-left coordinates and the midpoint of the top-right and the bottom-right coordinates with the width of the reference object. The pixels-per-metric value may be defined as number of pixels that may be accommodated in a given unit of measurement, for instance, millimeter, meters, inches, centimeter and so on. After determining the pixels-per-metric value the Euclidean distance between actual coordinates of at least one of corners and centroid of the obstruction and the coordinates of at least one of corners and centroid of the reference object 206 may be determined. The Euclidean distance between actual coordinates of the obstruction and coordinates of the reference object 206 may be divided by the pixels-per-metric value to determine the actual distance between the obstruction and the reference object 206 in inches.

In addition to determining the reference-obstruction distance, at least one of depth, width or height of the obstruction may be determined from the embedded image. In order to determine at least one of the depth, the width or the height of the obstruction, the rotated bounding box coordinates may be arranged in the top-left, the top-right, the bottom-right and the bottom-left corner of the grey scale image. At least one of the height and the depth of the obstruction may be determined in pixels by determining Euclidean distance between midpoint of top-left and top-right coordinates and midpoint of bottom-left and bottom-right coordinates. Then, the pixels-per-metric value may be determined by dividing the determined Euclidean distance between midpoint of top-left and top-right coordinates and midpoint of bottom-left and bottom-right coordinates with the width of the reference object 206. At least one of the height and the depth of the obstruction may be determined in inches by dividing the Euclidean distance between the midpoint of top-left and top-right coordinates and the midpoint of bottom-left and bottom-right coordinates with the pixels-per metric value. The width of the obstruction may be determined in pixels by determining Euclidean distance between the midpoint of top-left and bottom-left coordinates and midpoint of top-right and bottom-right coordinates. The width of the obstruction may be determined in inches by dividing the Euclidean distance between the midpoint of top-left and bottom-left coordinates and midpoint of top-right and bottom-right coordinates with the pixels-per-metric value.

After determining the reference-obstruction distance and at least one of the depth, the width and the height of the obstruction, a distance between the vehicle 204 and the obstruction may be determined at step 306. Determining the distance between the vehicle 204 and the obstruction is a two-step process. Initially, a distance 202 between the vehicle 204 and the reference object 206 may be extracted from the reference database 104 using the height 208 from the ground level to the position of the image capturing device 106 and the vertical viewing angle of the image capturing device 106. The vertical viewing angle used to extract the distance 202 between the vehicle 204 and the reference object 206 may be the vertical viewing angle of the image capturing device 106 when the image capturing device 106 captures an image of the obstruction. In one embodiment, the vertical viewing angle may be determined from camera specifications. For instance, $\alpha = 2 \arctan d/2f$ equation may be used, wherein $\alpha$ may represent the vertical viewing angle, d may represent size of a film in vertical direction and f may represent the focal length of the image capturing device 106.

The first step of calibration may be to capture images of the reference object 206. The second step of calibration may be to determine the distance 202 between the vehicle 204 and the reference object 206. In order to execute the second step of calibration, the distance 202 between the vehicle 204 and the reference object 206 may be determined at exact point of time when an image of the reference object 206 is captured. Populating the reference database 104 may be done previously, so that during run time the pre-generated reference object image and the distance 202 between the vehicle 204 and the reference object 206 may be available to the processing circuit 102. In one illustration, the distance 202 between the vehicle 204 and the reference object 206 for calibration purposes may be determined using a formula (h/tan $\beta$), where h may represent the height 208 from the ground level to the position of the image capturing device 106 and $\beta$ may represent the angle between ground level and the image capturing device 106. $\beta$ may be determined using the equation $\beta = 90 - \alpha$.

After determining the distance 202 between the reference object 206 and the vehicle 204, the distance between the vehicle 204 and the obstruction may be determined. In one illustration, (the distance between the vehicle and the obstruction) (the reference-obstruction distance)+(the distance between the vehicle and the reference object). In one embodiment, a distance travelled by the vehicle 204 during computation of the reference-obstruction distance may also be taken into account. For instance, (the distance between vehicle and the obstruction)=(the reference-obstruction distance)+(the distance between the vehicle and the reference object)−(the distance travelled by vehicle during computation).

After determining the distance between the vehicle 204 and the obstruction, navigation of the vehicle 204 may be controlled, at step 308. Controlling navigation of the vehicle 204 may include controlling speed of the vehicle 204 and controlling direction of the vehicle 204. Controlling the speed of the vehicle 204 may be based on the determined distance between the vehicle 204 and the obstruction and at least one of width, height or depth of the obstruction. The vehicle 204 may be able to negotiate the obstruction at a particular speed. The particular speed may be determined from at least one of the width, the depth or the height of the obstruction. Also, the determined distance between the vehicle 204 and the obstruction may assist in determining a time at which the vehicle 204 needs to decelerate, in order to avoid an accident. In one embodiment, a command control may be sent to one or more actuators in order to control throttle of the vehicle 204. In one illustration, a rule may be made according to which the vehicle 204 needs to decelerate when the distance between the vehicle 204 and the obstruction is two times the length of the vehicle 202 and vehicle speed is above a particular threshold. In one embodiment, the time at which the vehicle 204 needs to decelerate may also depend on a braking distance of the vehicle. The braking distance may change depending on the weather condition, time of day, composition and condition of tires, quality of suspension, quality of braking system, driver's experience and anti-lock braking system etc.

In addition to controlling the speed of the vehicle 204, the processing circuit 102 may also be able to control the direction of the vehicle 204. Controlling the direction of the vehicle 204 may be based on the determined distance between the vehicle 204 and the obstruction and at least one of the width, the depth, the height of the obstruction. The determined distance between the vehicle 204 and the obstruction may be used to determine a time at which the direction of the vehicle 204 needs to be changed. In one illustration, an alternative path may be made available to the vehicle 204 via the Global Positioning System (GPS) technology. In one embodiment, a control command may be sent to the one or more actuators of the vehicle 204, notifying the command to change direction of the vehicle 204. The actuators may control steering, braking and the throttle of the vehicle 204. In one embodiment, controlling the direction of the vehicle 204 may also include controlling the steering of the vehicle 204 when the vehicle 204 attempts to negotiate the obstruction. The steering of the vehicle 204 may be controlled based on at least one of the depth, the width or the height of the obstruction. Also, the determined distance between the vehicle 204 and the obstruction may be used to determine a time at which the steering of the vehicle 204 needs to be controlled.

What is claimed is:

1. A method of controlling navigation of a vehicle, the method comprising:
    generating, by a processing circuit, an embedded image comprising a pre-generated reference object image and an obstruction image, wherein the obstruction image is captured by an image capturing device associated with the vehicle,
        wherein the pre-generated reference object image is extracted from a reference database using image capturing device parameters associated with the vehicle, and
        wherein the image capturing device parameters comprises at least one of orientation of the image capturing device, height from ground level to a position of the image capturing device, or a vertical viewing angle of the image capturing device;
    determining, by the processing circuit, a reference-obstruction distance based on the embedded image, wherein the reference-obstruction distance is a distance between a reference object and an obstruction;
    determining, by the processing circuit, a distance between the vehicle and the obstruction based on the reference-obstruction distance; and
    controlling, by the processing circuit, navigation of the vehicle based on the distance between the vehicle and the obstruction.

2. The method as claimed in claim 1, wherein determining the distance between the vehicle and the obstruction comprises:
    extracting a distance between the vehicle and the reference object from the reference database using the height from the ground level to the position of image capturing device and the vertical viewing angle of the image capturing device; and
    determining the distance between the vehicle and the obstruction based on the reference-obstruction distance and the distance between the vehicle and the reference object.

3. The method as claimed in claim 1, further comprising determining at least one of depth, width or height of the obstruction.

4. The method as claimed in claim 3, wherein controlling the navigation of the vehicle comprises controlling speed of the vehicle based on at least one of the distance between the vehicle and the obstruction, the depth, the width or the height of the obstruction.

5. The method as claimed in claim 3, wherein controlling the navigation of the vehicle comprises controlling direction of the vehicle based on at least one of the distance between the vehicle and the obstruction, the depth, the width or the height of the obstruction.

6. The method as claimed in claim 1, wherein the obstruction comprises at least one of a pothole, a hump or a speed bump.

7. A system for controlling navigation of a vehicle, the system comprising:
    a processor;
    a memory communicatively coupled to the processor, wherein the memory stores one or more processor-executable instructions, which, on execution, causes the processor to:
    generate an embedded image comprising a pre-generated reference object image and an obstruction image, wherein the obstruction image is captured by an image capturing device associated with the vehicle,
        wherein the pre-generated reference object image is extracted from a reference database using image capturing device parameters associated with the vehicle, and
        wherein the image capturing device parameters comprises at least one of orientation of the image capturing device, height from ground level to a position of image capturing device, or a vertical viewing angle of the image capturing device;
    determine a reference-obstruction distance based on the embedded image, wherein the reference-obstruction distance is a distance between a reference object and an obstruction;
    determine a distance between the vehicle and the obstruction based on the reference-obstruction distance; and
    control navigation of the vehicle based on the distance between the vehicle and the obstruction.

8. The system as claimed in claim 7, wherein the processor is configured to determine the distance between the vehicle and the obstruction by:
    extracting a distance between the vehicle and the reference object from the reference database using the height from the ground level to the position of the image capturing device and the vertical viewing angle of the image capturing device; and determining the distance between the vehicle and the obstruction based on the reference-obstruction distance and the distance between the vehicle and the reference object.

9. The system as claimed in claim 7, wherein the processor is further configured to determine at least one of depth, width or height of the obstruction.

10. The system as claimed in claim 9, wherein the processor is configured to control the navigation of the vehicle by controlling speed of the vehicle based on at least one of the distance between the vehicle and the obstruction, the depth, the width or the height of the obstruction.

11. The system as claimed in claim 9, wherein the processor is configured to control the navigation of the vehicle by controlling direction of the vehicle based on at least one of the distance between the vehicle and the obstruction, the depth, the width or the height of the obstruction.

12. The system as claimed in claim 7, wherein the obstruction comprises at least one of a pothole, a hump or a speed bump.

* * * * *